(12) United States Patent
Buettner et al.

(10) Patent No.: US 7,684,901 B2
(45) Date of Patent: Mar. 23, 2010

(54) AUTOMATIC UTILITY USAGE RATE ANALYSIS METHODOLOGY

(76) Inventors: William L. Buettner, 8321 Carriage Hills Dr., Brentwood, TN (US) 37027; Stephen B. Austin, 2108 Dunhill Dr., Raleigh, NC (US) 27608-1536

( * ) Notice: Subject to any disclaimer, the term of this patent is extended or adjusted under 35 U.S.C. 154(b) by 283 days.

(21) Appl. No.: 11/824,361

(22) Filed: Jun. 29, 2007

(65) Prior Publication Data
US 2009/0006279 A1    Jan. 1, 2009

(51) Int. Cl.
G05D 3/12    (2006.01)
G05D 5/00    (2006.01)
G05D 9/00    (2006.01)
G05D 11/00   (2006.01)
G05D 17/00   (2006.01)

(52) U.S. Cl. .................. 700/291; 705/412; 702/61; 324/142

(58) Field of Classification Search ............... 700/291; 702/60–63; 705/412
See application file for complete search history.

(56) References Cited

U.S. PATENT DOCUMENTS

| | | | | |
|---|---|---|---|---|
| 5,216,623 | A * | 6/1993 | Barrett et al. | 702/62 |
| 5,859,839 | A * | 1/1999 | Ahlenius et al. | 370/252 |
| 6,366,889 | B1 * | 4/2002 | Zaloom | 705/7 |
| 6,686,923 | B2 * | 2/2004 | Ji et al. | 345/606 |
| 6,826,585 | B2 * | 11/2004 | Mitsunaga et al. | 708/446 |
| 7,515,877 | B2 * | 4/2009 | Chen et al. | 455/69 |
| 2006/0112123 | A1 * | 5/2006 | Clark et al. | 707/101 |
| 2006/0124744 | A1 * | 6/2006 | Gormish et al. | 235/462.08 |
| 2006/0177098 | A1 * | 8/2006 | Stam | 382/104 |
| 2007/0025505 | A1 * | 2/2007 | Bjorkholm | 378/53 |
| 2007/0082338 | A1 * | 4/2007 | Curry et al. | 435/6 |
| 2007/0130092 | A1 * | 6/2007 | Lee, Jr. | 705/412 |
| 2007/0136082 | A1 * | 6/2007 | Jackson et al. | 705/1 |
| 2007/0185391 | A1 * | 8/2007 | Morgan | 600/301 |
| 2007/0214102 | A1 * | 9/2007 | Maeda | 706/48 |
| 2007/0244604 | A1 * | 10/2007 | McNally | 700/291 |
| 2007/0271066 | A1 * | 11/2007 | Nikitin et al. | 702/181 |

FOREIGN PATENT DOCUMENTS

EP    1309062 A    5/1993

OTHER PUBLICATIONS

Fahrioglu, Murat, and Alvarado, Fernando L. "Designing Cost Effective Demand Management Contracts using Game Theory." Power Engineering Society 1999 Winter meeting, IEEE vol. 1, Jan. 31-Feb. 4, 1999 pp. 427-432 vol. 1.*

* cited by examiner

*Primary Examiner*—Ramesh B Patel
*Assistant Examiner*—Jason Lin (57) ABSTRACT

An automatic method of which days/hours represent good candidates for reducing demand to achieve potential savings and the amount of demand reduction that can be achieved with a tolerable level of disruption to status quo operations. Demand interval data including utility usage rate (UUR) values is received from one or more utility monitoring devices, and are sorted in descending order. A percent difference is calculated for each UUR value relative to the previous one, and a cumulative percent difference accumulates the percent differences from the preceding rows. The average cumulative percent difference is divided by the total number of UUR values in the measured period to produce a ratio. The standard deviation of time is determined, and from those demand data associated with ratios greater than a ratio threshold and standard deviations less than a standard deviation threshold the demand reduction amount and the number of control hours are determined.

19 Claims, 6 Drawing Sheets

| Row | A<br>Original Point | B<br>Date | C<br>Time with AM and PM | D<br>KWD | E<br>% Diff to Previous reading | F<br>Cumulative % Diff | G<br>Cumulative % diff/<br>% Cumulative time | H<br>Std Deviation |
|---|---|---|---|---|---|---|---|---|
| 1 | 226 | 02/03/2005 | 8:15:00 AM | 994 | 0.00% | 0 | 0 | 0.0 |
| 2 | 130 | 02/02/2005 | 8:15:00 AM | 988 | 0.60% | 0.60% | 8.308853119 | 0.0 |
| 3 | 131 | 02/02/2005 | 8:30:00 AM | 958 | 3.04% | 3.64% | 33.40360788 | 0.1 |
| 4 | 221 | 02/03/2005 | 7:00:00 AM | 950 | 0.84% | 4.48% | 30.80009631 | 0.7 |
| 5 | 180 | 02/02/2005 | 8:45:00 AM | 948 | 0.21% | 4.69% | 25.79923494 | 0.7 |
| 6 | 220 | 02/03/2005 | 6:45:00 AM | 944 | 0.42% | 5.11% | 23.43536808 | 0.8 |
| 7 | 223 | 02/03/2005 | 7:45:00 AM | 944 | 0.00% | 5.11% | 20.08745835 | 0.8 |
| 8 | 182 | 02/02/2005 | 9:15:00 AM | 926 | 1.91% | 7.01% | 24.13823157 | 0.9 |
| ... | ... | ... | ... | ... | ... | ... | ... | ... |
| 2688 | 2688 | 02/12/2005 | 5:00:00 PM | 133 | 205.00% | 205.00% | 2.05 | 7.0 |

AUTOMATIC UTILITY USAGE RATE ANALYSIS METHODOLOGY

FIELD OF THE INVENTION

This invention relates generally to utility monitoring systems, and more particularly, to a method for automatically recommending opportunities for reducing demand to achieve cost savings for a facility that consumes a utility.

BACKGROUND OF THE INVENTION

Utility companies charge facilities for their consumption of electrical power supplied by the utility company based upon the facility's peak demand consumption. These rates are set for a duration, such as one year, even though the facility may actually consume its peak consumption for a small fraction of the entire year. For example, if a facility's peak consumption is 1000 kilowatts (kW) for one 15 minute period during the entire year, the utility company will charge the facility based upon a peak consumption of 1000 kW. If the time and date of a facility's peak consumption can be pinpointed, ameliorative steps can be taken to reduce peak demand during those times. During the next renewal period, if the facility can reduce its overall peak consumption, it can realize significant cost savings over the entire contractual period. Other utility companies that supply water, air, gas, or steam may charge for the consumption of these utilities based upon a similar peak usage model.

Existing ways of identifying and reducing peak demand are manual. They are labor intensive, subject to very subjective factors and human limitations, and not always accurate.

What is needed is an automated method for identifying times and dates where demand usage can be reduced.

SUMMARY OF THE INVENTION

Briefly, according to an embodiment of the present invention, a method of automatically identifying candidates for reducing demand, includes: receiving, over a measured period, demand interval data collected by at least one utility monitoring device, the demand interval data including a number of utility usage rate (UUR) values and associated dates and times; sorting the UUR values in descending order to produce sorted UUR values and storing the sorted UUR values in rows of a table; for each of the rows, calculating a percent difference as a function of the sorted UUR value and the previous sorted UUR value in the table; for each of the rows, summing previous percent difference values to produce a cumulative percent difference; for each of the rows, dividing the average cumulative percent difference across the previous rows by the total number of UUR values in the measured period to produce a ratio; determining the largest row number whose associated ratio is less than a ratio threshold; for at least each of the rows up to the largest row, calculating a standard deviation of time as a function of the times associated with the UUR values; determining the row number whose associated standard deviation of time is less than a standard deviation threshold to produce a number of intervals of control; and storing in the memory data representative of the number of intervals of control and representative of the cumulative percent difference associated with the row number corresponding to the number of intervals of control.

The method may further include based on at least the rows up to the row number corresponding to the number of intervals of control, determining at least a time during which demand reduction will decrease overall peak demand during the measured period. The method may further include based on at least the rows up to the row number corresponding to the number of intervals of control, determining at least a day during which demand reduction will decrease overall peak demand during the measured period. The method may further include based on at least the rows up to the row number corresponding to the number of intervals of control, determining whether there exists any consecutive intervals of time during which demand reduction will decrease overall peak demand during the measured period. The method may further include displaying the data on a video display. The method may further include calculating a savings amount from the data representative of the cumulative percent difference associated with the row number corresponding to the number of intervals of control, and displaying the savings amount. The method may further include plotting the ratio against at least some of the rows to produce a slope plot and displaying the slope plot or plotting the standard deviation of time against at least some of the rows to produce a standard deviation plot and displaying the standard deviation plot.

The receiving may include reading the demand interval data from a file or querying the demand interval data from a database coupled to the at least one utility monitoring device. The ratio threshold may be at least 10 or no less than 10. The standard deviation threshold may be no less than 1.5 or at least 1.5. The ratio threshold may be 10 and the standard deviation threshold may be 1.5. The UUR values may be expressed in kilowatts, gallons per unit time, therms per unit time, pounds per unit time, or a hundred cubic feet (CCF) per unit time.

The above summary of the present invention is not intended to represent each embodiment, or every aspect, of the present invention. This is the purpose of the figures and the detailed description which follow.

BRIEF DESCRIPTION OF THE DRAWINGS

The foregoing and other advantages of the invention will become apparent upon reading the following detailed description and upon reference to the drawings.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Figure 1:
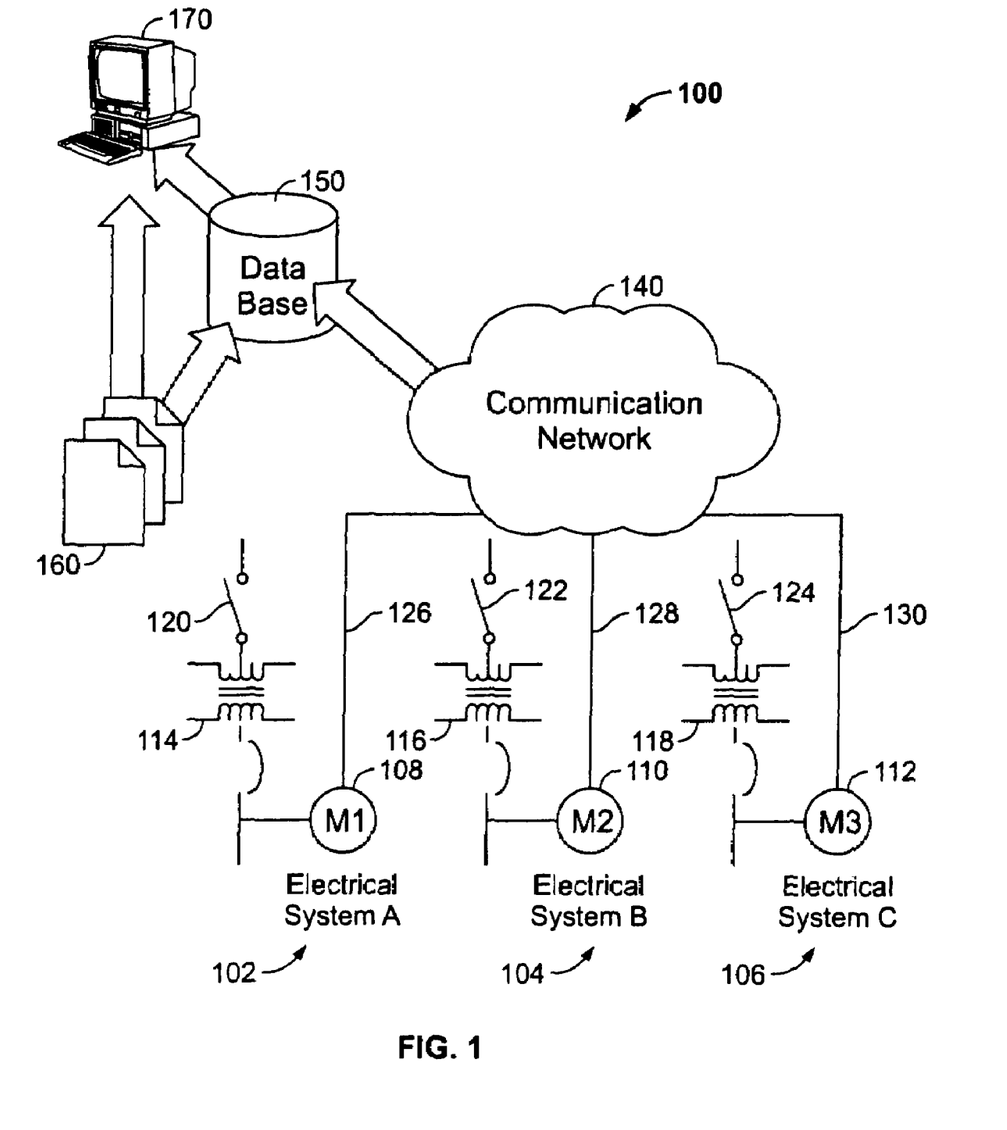
FIG. 1 is a functional block diagram of an exemplary utility monitoring system according to aspects of the various embodiments disclosed herein.

Turning now to FIG. 1, an exemplary utility monitoring system 100 is shown having a plurality of electrical systems 102, 104, 106, each having at least one power monitoring device 108, 110, 112 in communication with a communication network 140. Each electrical system 102, 104, 106 includes respective transformers 114, 116, 118 coupled to switches 120, 122, 124. A power monitoring device is an apparatus with the ability to sample, collect, or measure one or more electrical characteristics or parameters of the electrical systems 102, 104, 106. The power monitoring devices 108, 110, 112 may be a PowerLogic® CM4000T Circuit Monitor, a PowerLogic® Series 3000/4000 Circuit Monitor, or a PowerLogic® ION7550/7650 Power and Energy Meter available from Square D Company, for example.

Although the utility monitoring system 100 shown in FIG. 1 is a power monitoring system, aspects of the present invention are not limited to power monitoring systems, but rather are applicable to any system that monitors any characteristic of five utilities, commonly designated by the acronym WAGES, which stands for Water, Air, Gas, Electricity, or Steam. The utility monitoring systems include utility monitoring devices that measure a flow of a utility, and those measured values are referred to herein as a "utility usage rate." Non-limiting examples of a utility usage rate or "UUR" include: kilowatts (kW), kVAr (kilovolt-ampere reactive or reactance), therms (thm) per unit time (such as per hour or per day), or pounds-per-square-inch (PSI) per unit time, a hundred cubic feet (CCF) per unit time (e.g., per hour or per day), pounds per unit time (e.g., per hour or per day), and gallons per unit time (e.g., per hour or per day). These UUR values are measured and collected by the utility monitoring devices and can be communicated to a host system. It should be understood that although a specific aspect is described below with reference to a power monitoring system, other aspects of the various embodiments include a utility monitoring system that includes utility monitoring devices that measure characteristics of a WAGES utility.

The communication network 140 is coupled to a database 150, which stores demand interval data (including UUR values) received from the power monitoring devices 108, 110, 112 (or, in other embodiments, utility monitoring devices). The utility companies typically characterize demand as kWd, which refers to kilowatt of demand, which is a measure of the amount of electrical power that a customer demands from a utility company in a specific interval of time, generally 15 or 30 minutes, though other intervals are possible. A host computer 170 is coupled to the database 150. In another aspect, the host computer 170 is a standalone computer and receives the demand interval data from one or more files 160, which may also be inputted into the database 150, or from the database 150. The power monitoring devices 108, 110, 112 monitor demand usage, and transmits their demand interval data to the communication network 140 at periodic intervals with appropriate date- and time-stamping information. Alternatively, the demand interval data can be extracted manually from the monitoring devices 108, 110, 112 and provided to the host computer 170 via the files 160.

Figure 2A:
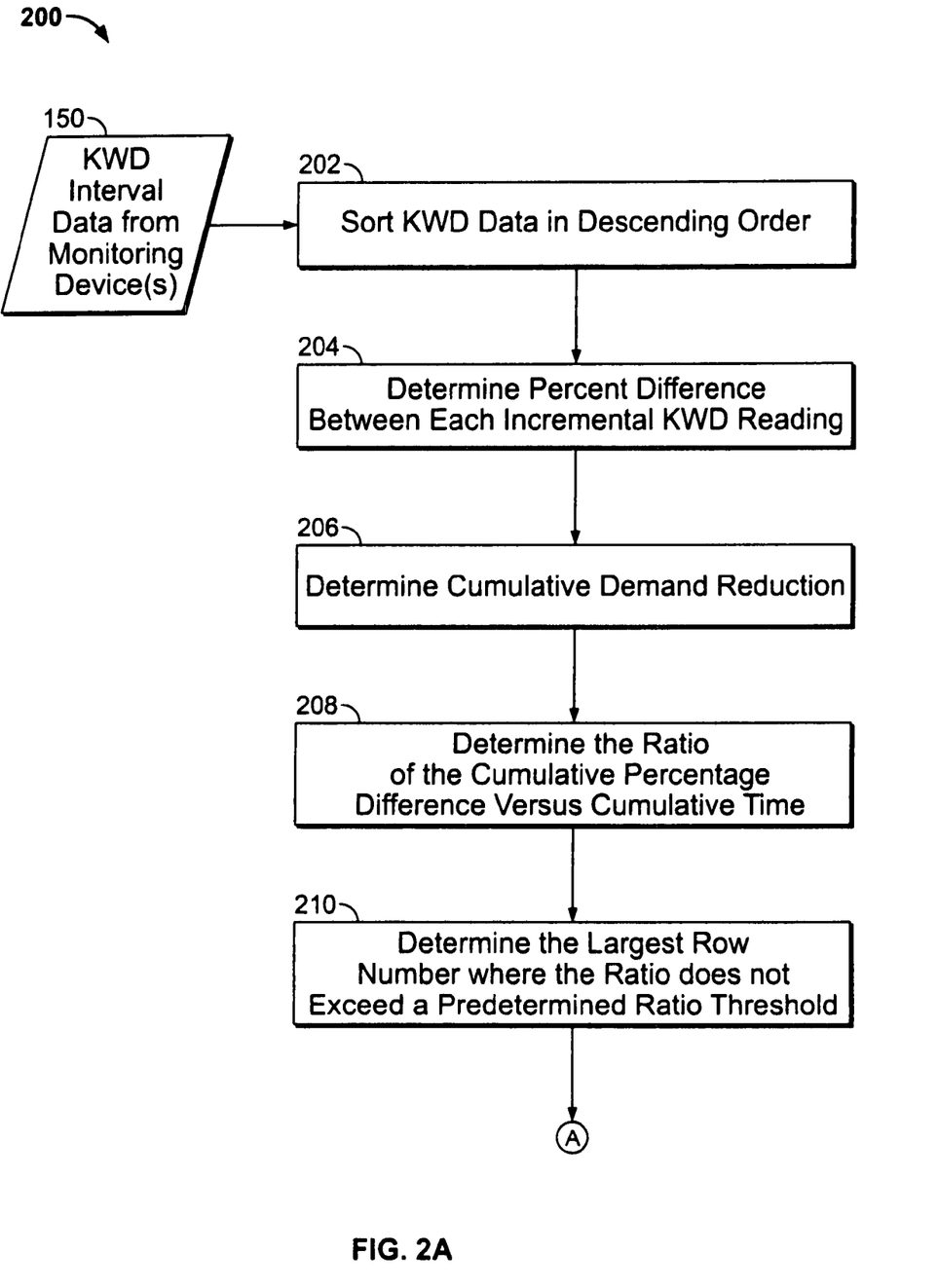
FIGS. 2A-2B illustrate a flow chart diagram of an exemplary algorithm according to aspects of the various embodiments disclosed herein.
Figure 2B:
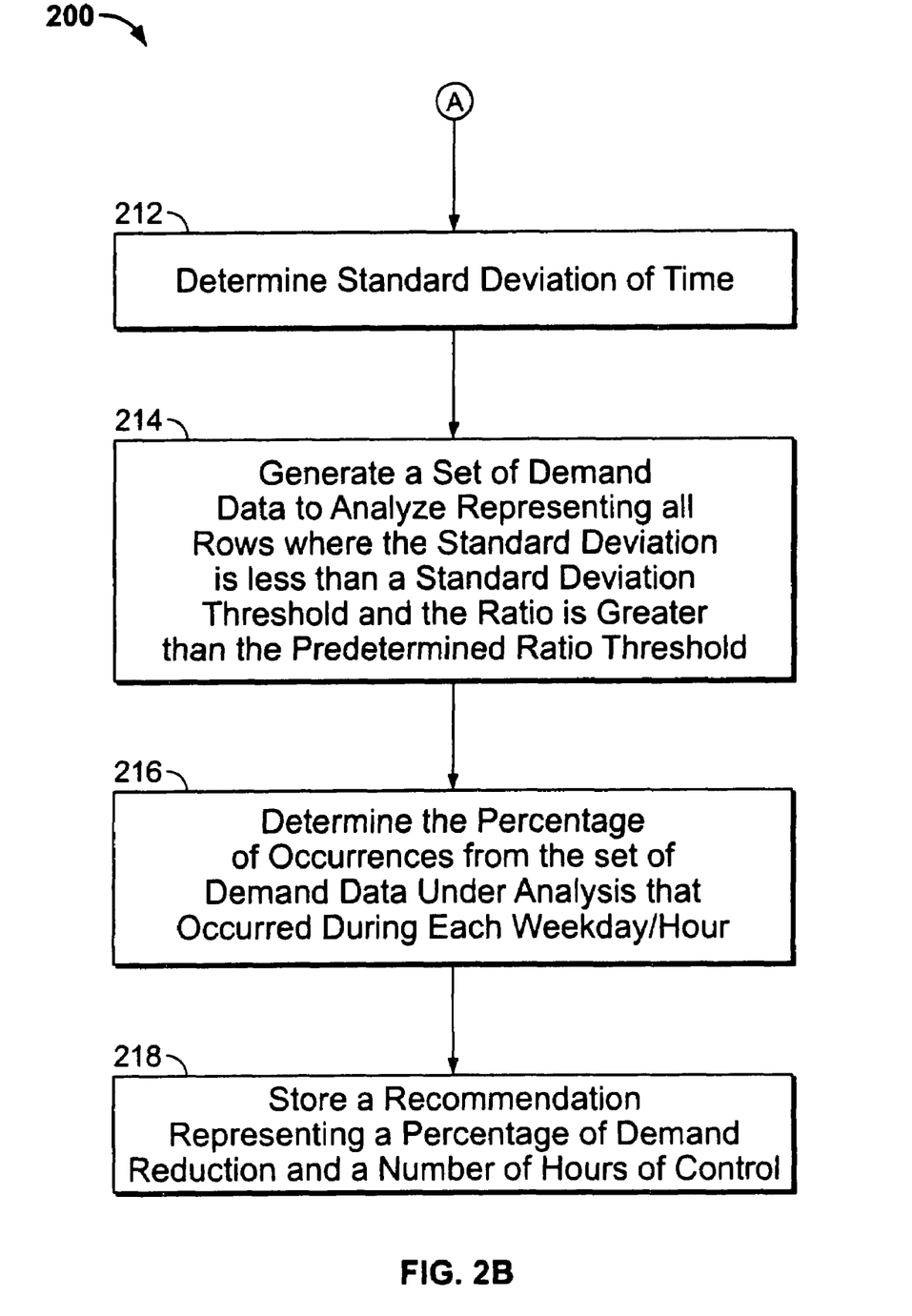

FIGS. 2A-2B illustrate a flow chart diagram of an algorithm 200 according to aspects of the various embodiments disclosed herein. The algorithm 200 receives demand interval data 150 from the power monitoring devices 108, 110, 112 either by querying the database 150 for demand data or from the data file(s) 160. The demand interval data 150 includes a date, the start time of the interval (e.g., 15 minutes or 30 minutes), and the kW value (or, in other embodiments, the UUR value) during the interval. This data 150 may be organized in rows and stored in a spreadsheet file or in a database format. The demand interval data 150 may include demand interval data for a date range, such as one or more weeks, one or more billing months, or one or more years. The demand interval data 150 includes kW values (or, in other embodiments, the UUR values) from any or all of the power monitoring devices 108, 110, 112 (or, in other embodiments, the utility monitoring devices) associated with electrical systems 102, 104, 106, respectively.

Figure 3:
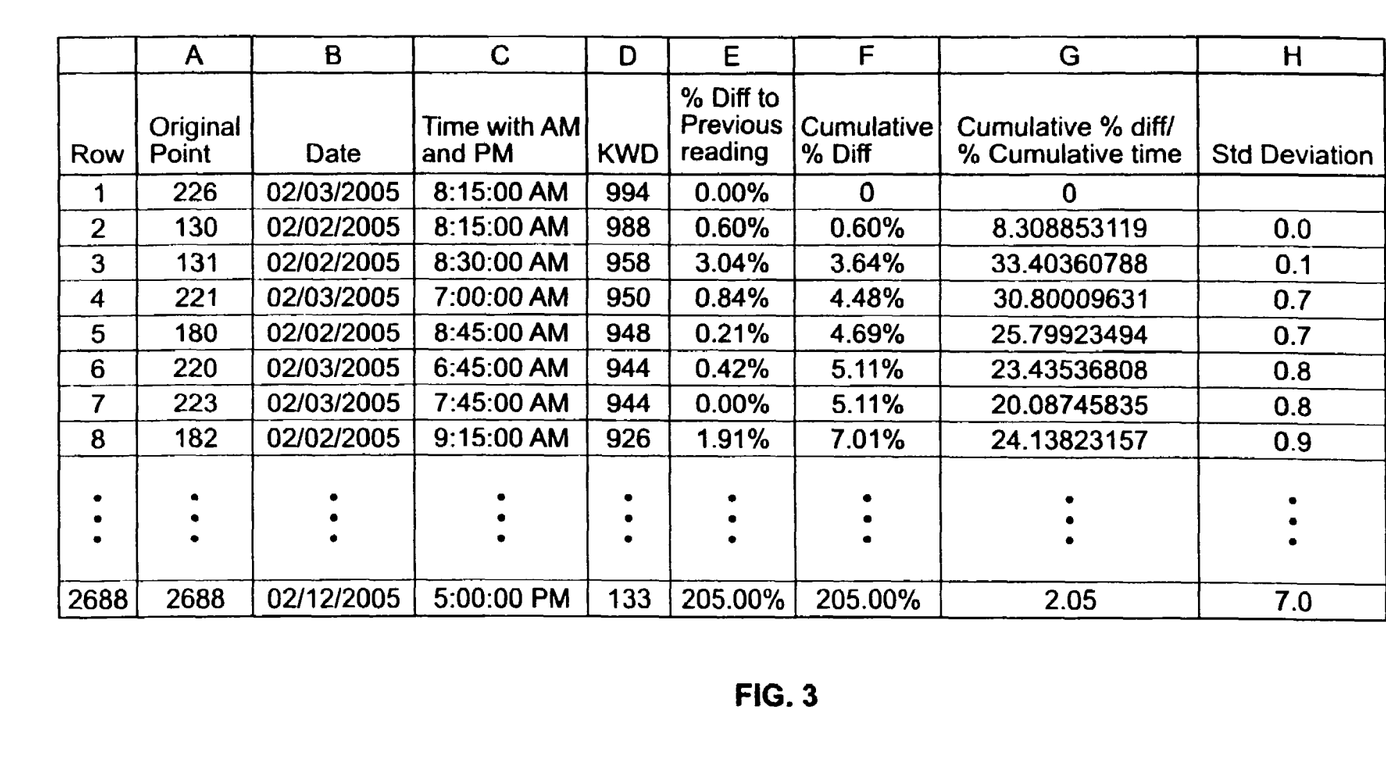
FIG. 3 is an exemplary spreadsheet showing a few rows of demand data and associated computations for identifying dates and times for potential savings opportunities according to aspects of the various embodiments disclosed herein.

Once the demand interval data 150 has been received, the algorithm 202 sorts the kW values (or, in other embodiments, the UUR values) in descending order, with the highest kW value first (202). FIG. 3 illustrates an exemplary spreadsheet showing demand data sorted in columns and rows. Column D shows the kW values sorted in descending order. Column A preserves the kW value's original point in the table prior to sorting. Columns B and C show the date and time, respectively, that the kW value was received.

The algorithm 200 determines the percent difference between each incremental kW entry (or, in other embodiments, the UUR entry) in the table (204). The percent difference is calculated as the current kW value minus the previous kW value divided by the previous kW value. Thus, in FIG. 3, the percent difference in cell E2 is calculated by the following: (D2-D1)/D1. A few exemplary percent differences associated with each kW value are shown in Column E of FIG. 3.

The algorithm 200 determines the cumulative demand reduction or percent difference (206). The Cumulative % Difference=Sum (% Difference Start to Current Row). Thus, the cumulative demand reduction or percent difference in cell F8 represents the sum of the percent difference values in E1-E8. A few exemplary cumulative percent differences are shown in Column F of FIG. 3.

The algorithm 200 determines the ratio of the cumulative percent difference relative to the cumulative time (208). The Ratio=Cumulative % Difference (column F in FIG. 3)/ % Cumulative Time, where the % Cumulative Time=Row number/Total number of points in the measured period. In this example, there are 2,688 rows in the measured period (e.g., a billing month). Of course, those skilled in the art will appreciate that any number of readings may be taken during a measured period, and that number may be less than or greater than 2,688. Thus, in FIG. 3, the ratio shown in cell G3 would be calculated as F3/ (3/2688). A few exemplary ratios are shown in Column G of FIG. 3.

Figure 4:
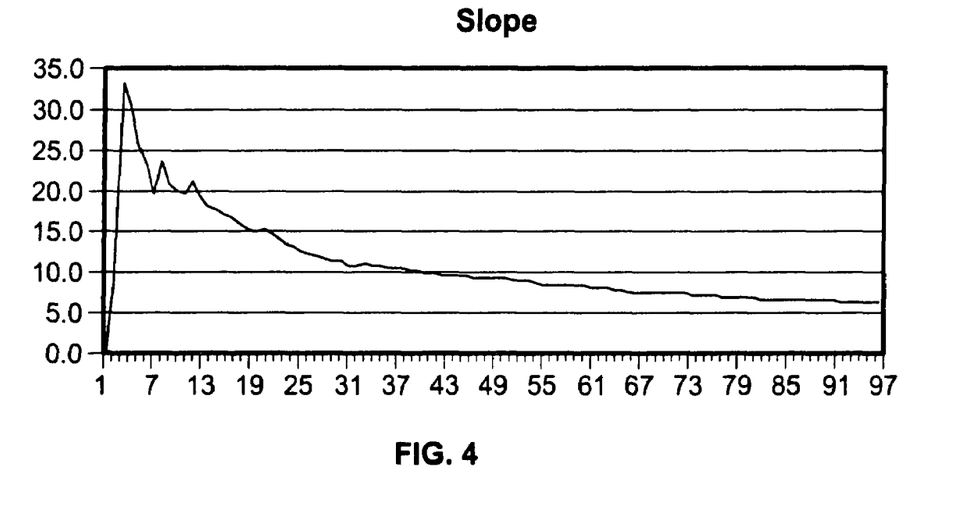
FIG. 4 is an exemplary chart plotting values shown in Column G in FIG. 3 against their respective row numbers according to aspects of the various embodiments disclosed herein.

The cumulative percent difference relative to cumulative time can be plotted, shown in FIG. 4, against each data point and its slope represents where potential savings opportunities can be realized. For example, the greater the slope, the more likely those points in the table 160 or database 150 represent demand reduction candidates. As seen from FIG. 4, the slope of the values from Column G of FIG. 3 eventually levels off around 10. Graphical data such as shown in FIG. 4 may be presented graphically to an operator of the host computer 170 for selection of a predetermined ratio threshold. The goal is to select a value where the most demand reduction can be realized in the shortest period of time.

The algorithm 200 determines the largest row number in the spreadsheet where the ratio (Column G) does not exceed a predetermined ratio threshold (210). In this non-limiting example, the predetermined ratio threshold is selected to be 10. Note that in FIG. 3, cell G2 is less than 10, but the algorithm 200 continues its search for the largest row number where the ratio does not exceed 10. The ratio values begin to trend downward after G2, and although not shown in FIG. 3, eventually at row 42, the ratio in Column G drops below 10. The ratio value of 10 represents a value that provides the customer with acceptable disruption. Each customer will have different tolerances for disruption, so the predetermined ratio threshold will vary by customer. It has been found that a ratio of 10 is generally acceptable in most cases as providing a reasonable level of disruption in exchange for the proposed monetary savings that the customer can realize if the demand reductions can be carried out. The points above the row where the predetermined ratio threshold is not exceeded (row 42 in this example) represent the candidates for potential monetary savings opportunities.

Figure 5:
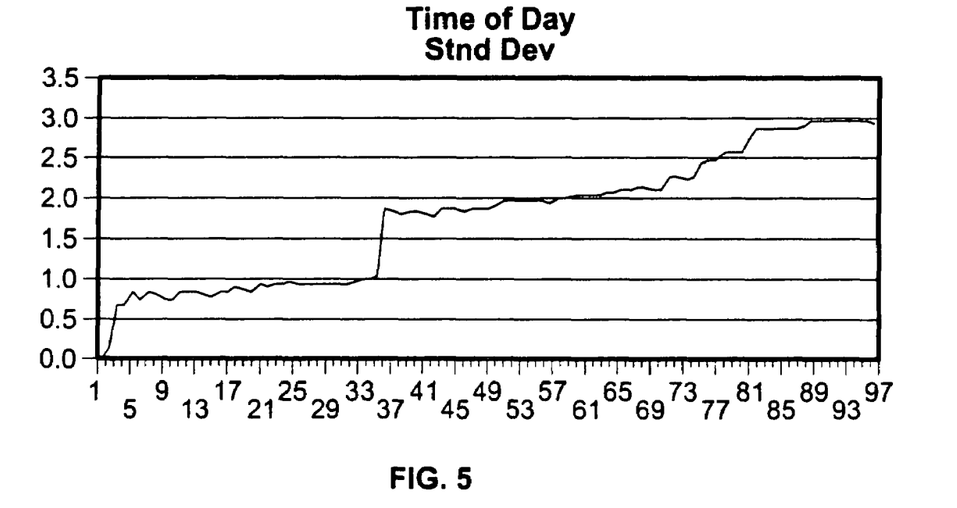
FIG. 5 is an exemplary chart plotting values shown in Column H of FIG. 3 against their respective row numbers according to aspects of the various embodiments disclosed herein.

The algorithm 200 determines the standard deviation of time (column C in FIG. 3) for the candidate rows whose ratios do not exceed the predetermined ratio threshold (212). A few exemplary standard deviation values are shown in Column H of FIG. 3. Thus, the standard deviation value in cell H5 is calculated by computing the standard deviation of cells C1-C5 and multiplying that value by 24 (the number of hours in a day). These standard deviation values represent the number of hours in a day that a customer would have to tolerate a disruption in order to realize potential savings versus the status quo. The higher this number, the more hours in the day a customer would have to tolerate disruptions in order to realize greater potential savings. While different customers will have different tolerances, in a particular aspect, a standard deviation of 1.5 hours is selected to be an acceptable level of disruption that a reasonable customer can tolerate. In this example, 1.5 represents a standard deviation threshold. It should be understood that the value of 1.5 is merely exemplary, and in other aspects of the various embodiments disclosed herein, a lower or higher standard deviation threshold may be selected depending upon the customer's tolerance or intolerance for disruption. For example, a medical facility may have less tolerance for disruption than a food processing plant and may prefer a higher standard deviation threshold than the food processing plant would. The standard deviation can be plotted against the rows, such as shown in FIG. 5. This exemplary graphic may be displayed to the operator of the host computer 170 who may be prompted to select a standard deviation threshold for input into the algorithm 200.

The algorithm generates a set of demand data (8 exemplary rows are shown in FIG. 3) to analyze, which represents all rows where the standard deviation is less than the standard deviation threshold (1.5 in this example) and where the ratio is greater than the predetermined ratio threshold (10 in this example) (214). This set of demand data is now analyzed by the algorithm 200 to determine when potential savings opportunities can be realized and by how much. In this example, there are 36 rows of demand data meeting these criteria. 36 rows each representing a 15 minute interval correspond to 9 hours.

Figure 6:
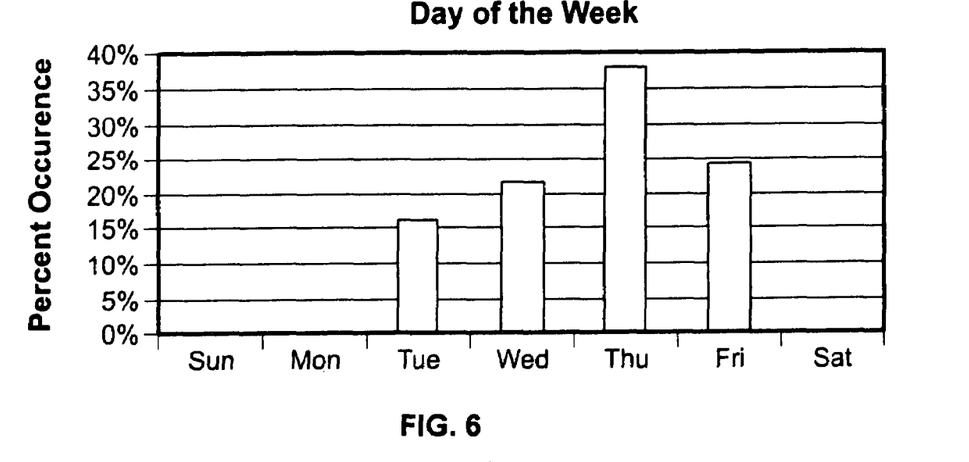
FIG. 6 is an exemplary bar chart showing the percentage of occurrences of a value in a set of values under analysis and on which days of the week those occurrences occur according to aspects of the various embodiments disclosed herein.
Figure 7:
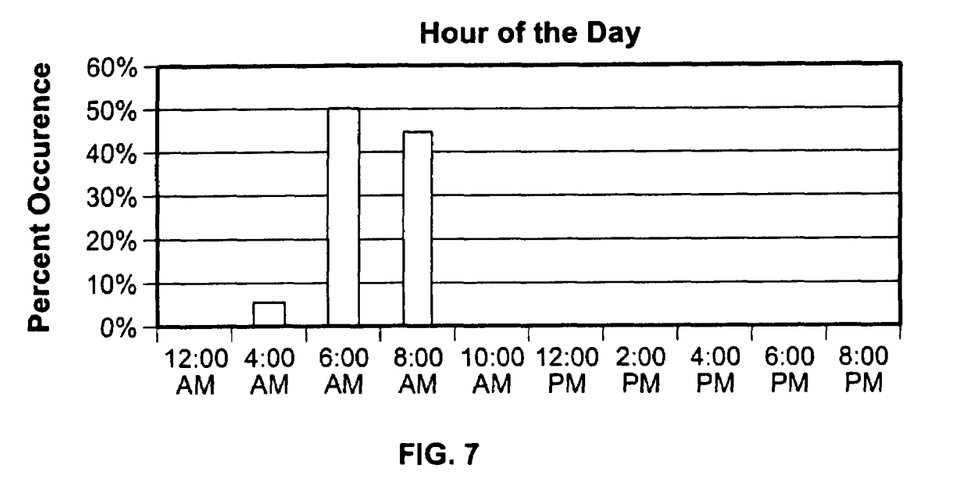
FIG. 7 is an exemplary bar chart showing the percentage of occurrences of a value in a set of values under analysis and on which hours of the day those occurrences occur according to aspects of the various embodiments disclosed herein.

The algorithm 200 determines the percentage of occurrences from the set of demand data under analysis (36 rows in this example) that occurred during each day or hour of the day (216) of the billing month. An example chart showing the percentage of occurrences during each day of the week is shown in FIG. 6, and FIG. 7 is a chart showing the percentage of occurrences during each hour of the day. These charts may be displayed graphically to the operator of the host computer 170 to aid the operator in understanding on which days and during which time(s) the most potential savings can be realized. For example, from FIG. 6, it is readily apparent that Thursdays represent the greatest opportunity for savings, so reductions in demand usage on Thursdays during the billing month would help reduce overall demand. Similarly, FIG. 7 shows that the time range between approximately 6 a.m. and 10 a.m. represents the hours of the day during the billing month that present the greatest opportunity for maximizing savings.

The percentage of demand reduction is taken from Column F36 (not shown), which represents the last row that meets the criteria described above (i.e., standard deviation<1.5 and ratio>=10). In this example, 14% demand reduction is possible with 9 hours of control. This recommendation is stored (218) and optionally displayed in some format to the operator of the host computer 170. Thus, if the facility can reduce its demand by 14% over 9 hours during the measured period, it can reduce its overall peak demand, which is the basis for the utility's rate charged to the facility. By reducing its peak demand, the facility can realize significant cost savings because the utility will have to adjust the rates charged to the facility downward based upon a lowered peak demand.

If rate or tariff data is supplied via the files 160 or stored in the database 150, the algorithm 200 can also calculate the amount of potential savings based upon the percentage of demand reduction. The algorithm can also report to the operator the number of consecutive intervals that a high kW value (or, in other embodiments, a high UUR value) is present. For example, high kW values may be present from 8:00 a.m. to 8:30 a.m. If the interval is 15 minutes, then this time range includes two consecutive intervals during which potential savings can be realized. Recommending larger blocks of consecutive times for demand reduction is useful to a facility because it reduces disruption to the facility if ameliorative activities can be spread out over a larger block of time.

The algorithm 200 includes machine readable instructions for execution by: (a) a processor, (b) a controller, and/or (c) any other suitable processing device. The algorithm may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a processor and/or embodied in firmware or dedicated hardware in a well known manner (e.g., it maybe implemented by an application specific integrated circuit (ASIC), a programmable logic controller (PLC), a field programmable logic device (FPLD), discrete logic, etc.). Also, some or all of the machine readable instructions represented by the flowchart of FIGS. 2A-2B may be implemented manually. Further, although the example algorithm is described with reference to the flowchart illustrated in FIGS. 2A-2B, persons of ordinary skill in the art will readily appreciate that many other methods of implementing the example machine readable instructions may alternatively be used. For example, the order of execution of the blocks may be changed, and/or some of the blocks described may be changed, eliminated, or combined.

While particular embodiments and applications of the present invention have been illustrated and described, it is to be understood that the invention is not limited to the precise construction and compositions disclosed herein and that various modifications, changes, and variations may be apparent

What is claimed is:

1. A method of automatically identifying candidates for reducing demand, comprising:

receiving, over a measured period, demand interval data collected by at least one utility monitoring device, the demand interval data including a number of utility usage rate values and associated dates and times;

sorting, by a processor, the utility usage rate values in descending order from the highest utility usage rate value to the lowest utility usage rate value to produce sorted utility usage rate values and storing the sorted utility usage rate values in rows of a table, each of the rows having an associated row number;

for each of the rows starting with the second row, calculating, by the processor, a percent difference as a function of the sorted utility usage rate value and the sorted utility usage rate value in an immediately preceding one of the rows of the table;

for each of the rows starting with the second row, summing, by the processor, previous percent difference values to produce a cumulative percent difference;

for each of the rows starting with the second row, dividing, by the processor, the cumulative percent difference by a cumulative time to produce a ratio, wherein the cumulative time is calculated by dividing the row number of the row by a total of all of the utility usage rate values in the measured period;

determining, by the processor, a largest row number of the rows whose associated ratio is less than a ratio threshold;

starting with the second row, for at least each of the rows up to the largest row whose associated ratio is less than the ratio threshold, calculating, by the processor, a standard deviation of time as a function of the times associated with the utility usage rate values;

determining, by the processor, the row number whose associated standard deviation of time is less than a standard deviation threshold and whose associated ratio is less than the ratio threshold to produce a number of intervals of control;

storing in a memory data representative of the number of intervals of control and representative of the cumulative percent difference associated with the row number corresponding to the number of intervals of control; and displaying a representation of the data on a video display.

2. The method of claim 1, further comprising, based on at least the rows up to the row number corresponding to the number of intervals of control, determining at least a time during which demand reduction will decrease overall peak demand during the measured period.

3. The method of claim 2, further comprising, based on at least the rows up to the row number corresponding to the number of intervals of control, determining at least a day during which demand reduction will decrease overall peak demand during the measured period.

4. The method of claim 3, further comprising, based on at least the rows up to the row number corresponding to the number of intervals of control, determining whether there exists any consecutive intervals of time during which demand reduction will decrease overall peak demand during the measured period.

5. The method of claim 1, wherein the receiving includes reading the demand interval data from a file.

6. The method of claim 1, wherein the receiving includes querying the demand interval data from a database coupled to the at least one utility monitoring device.

7. The method of claim 1, further comprising calculating a savings amount from the data representative of the cumulative percent difference associated with the row number corresponding to the number of intervals of control, and displaying the savings amount.

8. The method of claim 1, further comprising plotting the ratio against at least some of the rows to produce a slope plot and displaying the slope plot.

9. The method of claim 1, further comprising plotting the standard deviation of time against at least some of the rows to produce a standard deviation plot and displaying the standard deviation plot.

10. The method of claim 1, wherein the ratio threshold is at least 10 and no greater than 35.

11. The method of claim 1, wherein the standard deviation threshold is no less than 1.5 and no greater than 3.0.

12. The method of claim 1, wherein the ratio threshold is above 0 and less than 35.

13. The method of claim 1, wherein the standard deviation threshold is above 0 and less than 3.0.

14. The method of claim 1, wherein the ratio threshold is 10 and the standard deviation threshold is 1.5.

15. The method of claim 1, wherein the utility usage rate is kilowatts.

16. The method of claim 1, wherein the utility usage rate is gallons per unit time.

17. The method of claim 1, wherein the utility usage rate is therms per unit time.

18. The method of claim 1, wherein the utility usage rate is pounds per unit time.

19. The method of claim 1, wherein the utility usage rate is a hundred cubic feet (CCF) per unit time.

* * * * *